US012560754B2

(12) United States Patent
Cahill et al.

(10) Patent No.: US 12,560,754 B2
(45) Date of Patent: Feb. 24, 2026

(54) WAVELENGTH REFERENCE HAVING REPEATING SPECTRAL FEATURES AND UNIQUE SPECTRAL FEATURES

(71) Applicant: II-VI Delaware, Inc., Wilmington, DE (US)

(72) Inventors: Michael John Laurence Cahill, Melbourne (AU); Glenn D. Bartolini, Waltham, MA (US)

(73) Assignee: II-VI DELAWARE, INC., Wilmington, DE (US)

( * ) Notice: Subject to any disclaimer, the term of this patent is extended or adjusted under 35 U.S.C. 154(b) by 911 days.

(21) Appl. No.: 17/826,608

(22) Filed: May 27, 2022

(65) Prior Publication Data

US 2023/0384541 A1    Nov. 30, 2023

(51) Int. Cl.
*G02B 5/28*        (2006.01)
*G02B 6/02*        (2006.01)
(Continued)

(52) U.S. Cl.
CPC ........... *G02B 6/02052* (2013.01); *G02B 5/28* (2013.01); *H04B 10/677* (2013.01); *H04J 14/0204* (2013.01); *G02B 6/4215* (2013.01)

(58) Field of Classification Search
CPC .... G02B 6/02052; G02B 5/28; G02B 6/4215; G02B 6/4206; G02B 6/4214; H04B 10/677; H04J 14/0204
See application file for complete search history.

(56) References Cited

U.S. PATENT DOCUMENTS 6,043,883 A * 3/2000 Leckel .................. G01J 9/0246
                                                    356/454
6,115,122 A    9/2000 Bao et al.
                        (Continued)

FOREIGN PATENT DOCUMENTS

CA        3107172 A1 * 7/2021 ......... H01S 5/18302
CN    106687781 A * 5/2017 ............ G01J 3/0227
                        (Continued)

OTHER PUBLICATIONS

"Optoplex Corporation, Pigtailed Fabry-Perot Etalon Devices, downloaded http://www.optoplex.com/download/Optoplex%20Inline%20Fabry-Perot%20Etalon%20Brochure_2020.pdf".
(Continued)

*Primary Examiner* — Michelle M Iacoletti
*Assistant Examiner* — Maher Yazback
(74) *Attorney, Agent, or Firm* — Blank Rome LLP

(57)        ABSTRACT

A wavelength reference device includes a broadband optical source, a repeating filter, and a wavelength-specific filter. The source, which can be a super-luminescent light-emitting diode (SLED), emits optical power. The repeating filter, which can be a Fabray-Perot etalon, filters the optical power into a repeating spectral response, and the wavelength-specific filter attenuates the optical power of at least one predefined wavelength response within the wavelength band. The repeating filter and the wavelength-specific filter output a wavelength reference signal having the repeating spectral response attenuated at the at least one predefined wavelength response. The predefined wavelength response reduces the ambiguity that can occur in the repeating frequency locations found in the repeating spectral response. In this way, an absolute wavelength reference is intrinsically provided in the wavelength reference that removes the
(Continued)

location ambiguity caused by the repeating spectral response.

19 Claims, 6 Drawing Sheets

(51) Int. Cl.

| | | |
|---|---|---|
| *H04B 10/67* | (2013.01) | |
| *H04J 14/02* | (2006.01) | |
| *G02B 6/42* | (2006.01) | |

(56) References Cited

U.S. PATENT DOCUMENTS

| | | | | |
|---|---|---|---|---|
| 6,498,800 | B1 * | 12/2002 | Watterson | G01J 9/0246 |
| | | | | 372/20 |
| 6,549,687 | B1 * | 4/2003 | Kochergin | G01N 21/7703 |
| | | | | 250/227.27 |
| 7,161,725 | B2 * | 1/2007 | Fraser | H01S 5/0687 |
| | | | | 372/20 |
| 8,160,444 | B2 * | 4/2012 | Tyler | G01J 3/0291 |
| | | | | 398/9 |
| 2002/0196818 | A1 * | 12/2002 | Funakawa | H01S 5/141 |
| | | | | 372/20 |
| 2003/0016707 | A1 * | 1/2003 | McDonald | G02B 5/281 |
| | | | | 372/20 |
| 2004/0190571 | A1 * | 9/2004 | Sutton | H01S 5/0687 |
| | | | | 372/32 |
| 2006/0076476 | A1 * | 4/2006 | Thingbo | G01D 5/35316 |
| | | | | 250/227.23 |
| 2008/0043227 | A1 * | 2/2008 | Minneman | G01M 11/335 |
| | | | | 356/213 |
| 2022/0128406 | A1 | 4/2022 | Cahill et al. | |
| 2022/0231780 | A1 * | 7/2022 | Gong | H04J 14/0268 |

FOREIGN PATENT DOCUMENTS

| | | | | | |
|---|---|---|---|---|---|
| DE | 3738179 | A | * | 5/1989 | G01J 5/12 |
| WO | WO-0111392 | A2 | * | 2/2001 | H01S 5/0687 |
| WO | WO-2014096292 | A1 | * | 6/2014 | G01D 18/00 |

OTHER PUBLICATIONS

Cahill , et al., "Wavelength Reference Using Repeating Spectral Features and Unique Spectral Feature", Sep. 21, 2021, 11 pgs.

* cited by examiner

Notch filter (to remove one or more peaks)

(a)

Edge pass notch filter (b)

Band Edge Filter #1 (filter one end)

(c)

Band Edge filter #2 (filter other end)

(d)

Multi-Band Pass filter (e)

Full Band Pass filter (filter both ends)

(f)

*210A*

*200*

WLREF
Component

*212*

Wavelenght-
Specific
Filter

*202*  *204*

*206*

*210B*

*220*

SLED Package

*222*

Dielectric
Filter Chip

*224*

*230*

Repeating Optical
Filter

*232*

Dielectric
Filter Chip

*234*

240

Source/Filter Package

Modified     242
Sub-component

WAVELENGTH REFERENCE HAVING REPEATING SPECTRAL FEATURES AND UNIQUE SPECTRAL FEATURES

BACKGROUND OF THE DISCLOSURE

Optical channel monitors, optical spectrum analyzers, and other wavelength-sensitive equipment use a wavelength reference device as a source for a wavelength reference (WLREF). An error in the equipment's wavelength (or frequency) relative to the wavelength reference is measured so the error can be potentially minimized.

For example, FIG. 1 illustrates a wavelength reference device 20 according to the prior art for providing a wavelength reference signal 28 for wavelength-sensitive equipment 10. The wavelength reference device 20 can include a broadband optical source 22 (e.g., SLED) and an optical filter 24 having known spectral characteristics. The optical filter 24 creates one or more unique spectral features that are used as reference wavelengths for the wavelength-sensitive equipment 10 to maintain its wavelength accuracy.

A typical optical filter 24 for the wavelength reference device 20 includes a dielectric filter, which produces a single transmission peak or notch at a specific wavelength. Another typical optical filter 24 for the wavelength reference device includes a Fabry-Perot etalon, which produces a repeating spectral response having peaks that repeat over several wavelengths.

A repeating spectral response, such as produced by a Fabry-Perot etalon, can be of significant benefit compared to a single transmission peak because the repeating spectral response provides information across a wavelength band. However, the repeating spectral response may pose problems for correctly identifying wavelengths because the repeating spectral response looks similar for different wavelengths. Due to this similarity, neighboring peaks may be incorrectly used as a wavelength reference, which can result in an adjustment of the wavelength-sensitive equipment to the wrong wavelength location.

For example, the wavelength reference device 20 may have an optical filter 24 that produces a repeating spectral response having an optical frequency period of $\Delta F$ GHz. It may be difficult (or impossible) to resolve any frequency differences greater than $0.5*\Delta F$ because the nearest spectral feature (in optical frequency) may not be the correct feature. An example optical filter 24 with this limitation is a Fabry-Perot etalon with a 100 GHz period between peaks. If this Fabry-Perot filter 24 is used in conjunction with a SLED 22 to provide a wavelength reference for an optical channel monitor 10 (OCM), the OCM 10 may use the wavelength reference to maintain frequency accuracy with starting frequency shifts of up to ±50 GHz. The starting frequency shift is defined as the actual spectral shift when the wavelength reference is first used.

If the OCM's frequency accuracy is 75 GHz when the wavelength reference is first used, however, then the closest peak is 25 GHz away from the location expected by the OCM 10, whereas the peak that should be used is 75 GHz away. In this case, the OCM 10 does not have any additional information to make a correct determination of which peak is the one to use to reduce the frequency error. As a result, the OCM will adjust the spectrum to the wrong channel, inducing a frequency shift of 100 GHz.

The subject matter of the present disclosure is directed to overcoming, or at least reducing the effects of, one or more of the problems set forth above.

SUMMARY OF THE DISCLOSURE

As disclosed herein, a wavelength reference device comprises a broadband optical source, a repeating filter, and a wavelength-specific filter. The broadband optical source is configured to emit optical power along an optical path. The optical power has a wavelength band. The repeating filter is positioned in the optical path and is configured to filter the optical power into a repeating spectral response within the wavelength band. The wavelength-specific filter is also positioned in the optical path and is configured to attenuate the optical power of at least one predefined wavelength response within the wavelength band. The repeating filter and the wavelength-specific filter output a wavelength reference signal of the optical power having the repeating spectral response attenuated at the at least one predefined wavelength response.

As disclosed herein, an apparatus, such as an optical channel monitor, is used to process signal input. The apparatus comprises an input, a signal detection and processing module, a wavelength reference module, and at least one controller.

The input of the apparatus receives the signal input, and the signal detection and processing module is configured to detect and process the signal input. The wavelength reference module has a device as discussed above, which is disposed in optical communication with the input and is configured to produce a wavelength reference. The at least one controller is in signal communication with at least the signal detection and processing module and the wavelength processing module. The at least one controller is configured to control the wavelength reference module and is configured to calibrate the signal detection and processing module based on the produced wavelength reference.

A method is disclosed herein to process signal input. The method comprises: emitting optical power along an optical path from a broadband optical source, the optical power having a wavelength band; filtering the optical power into a repeating spectral response within the wavelength band using a repeating filter positioned in the optical path; attenuating the optical power of at least one predefined wavelength response within the wavelength band using a wavelength-specific filter positioned in the optical path; and outputting a wavelength reference signal of the optical power having the repeating spectral response attenuated at the at least one predefined wavelength response.

The foregoing summary is not intended to summarize each potential embodiment or every aspect of the present disclosure.

DETAILED DESCRIPTION OF THE DISCLOSURE

Figures 1, 2, 3:
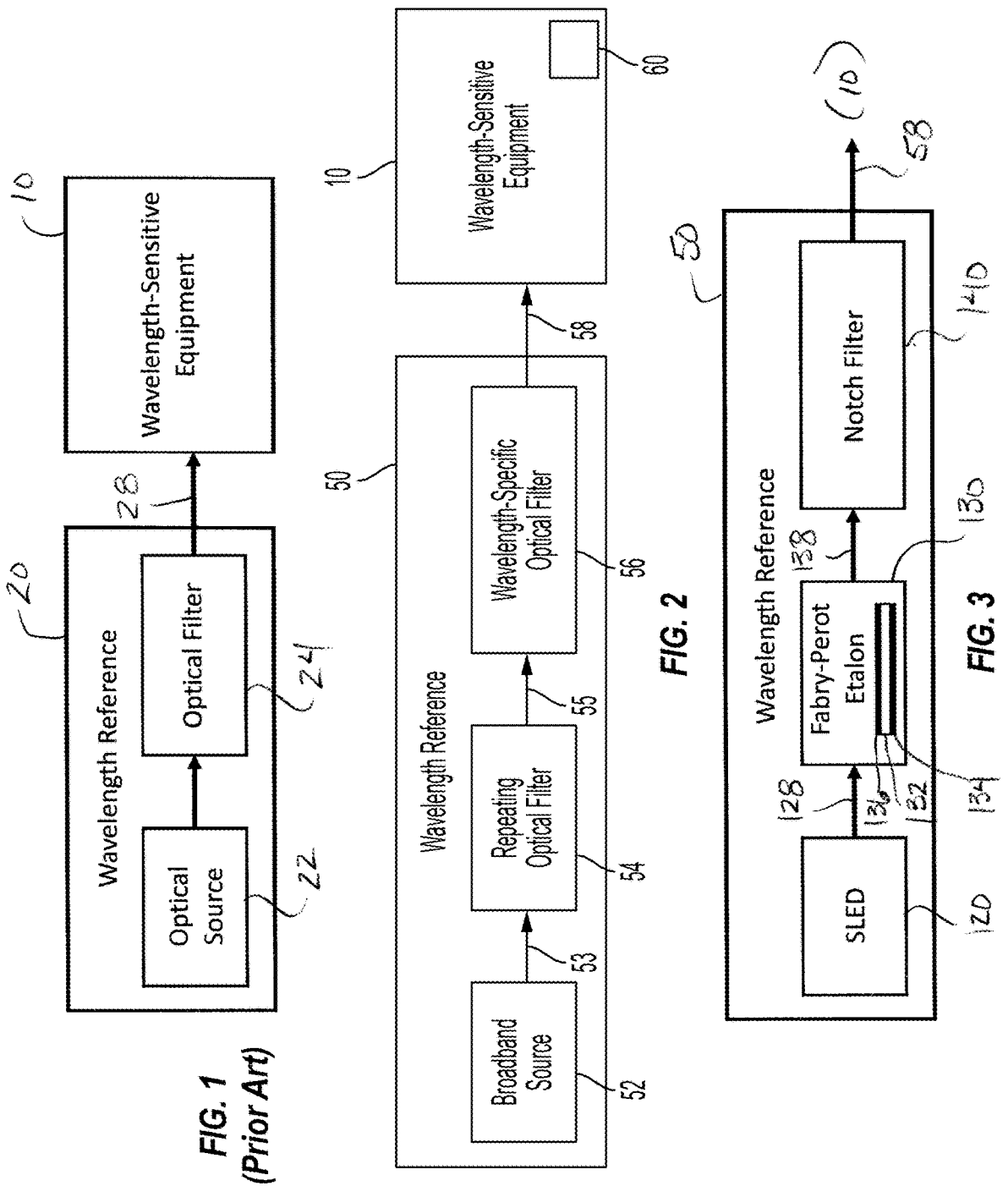
FIG. 1 illustrates a wavelength reference device according to the prior art for providing a wavelength reference signal to wavelength-sensitive equipment.
FIG. 2 illustrates a wavelength reference device according to the present disclosure for providing a wavelength reference signal to wavelength-sensitive equipment.
FIG. 3 illustrates one configuration for the wavelength reference device of the present disclosure.

FIG. 2 illustrates a wavelength reference device 50 according to the present disclosure for providing a wavelength reference signal 58 to wavelength-sensitive equipment 10. The wavelength reference device 50 includes a broadband optical source 52, a repeating filter 54, and a wavelength-specific filter 56. As shown here, the wavelength-specific filter 56 is located after the repeating filter 54. However, the wavelength-specific filter 56 can also be located between the source 52 and the repeating filter 54. The wavelength-sensitive equipment 10, which can be an optical channel monitor, optical spectrum analyzer, or another type of module, uses the wavelength reference signal 58 (WLREF) to measure an error in the equipment's wavelength (or frequency) so the error can be potentially minimized.

To generate the wavelength reference signal 58, the source 52 produces a broadband signal 53. The repeating filter 54 has known spectral characteristics and filters the broadband signal 53 to create a filtered signal or optical spectrum 55 having repeating spectral features. In the wavelength reference signal 58 output by the device 50, these repeating spectral features are used as reference wavelengths for the wavelength-sensitive equipment 10 to maintain its wavelength accuracy.

The wavelength-specific filter 56 filters the optical spectrum 55 from the repeating filter 54 and creates a wavelength-specific spectral feature in the repeating optical spectrum for the wavelength reference signal 58. For example, the wavelength-specific filter 56 can be configured to produce a band-reject or a notch at a specific wavelength in the spectrum. The filter 56 can be a notch filter, a band-stop filter, a band-pass filter, or a band-rejection filter. As such, the notch filter 56 can be configured to transmit most wavelengths incident thereto without much loss in optical power, but the power of light within a specific wavelength range (i.e., the stopband) is attenuated to a very low optical power. The notch filter 56 can use a dielectric stack on a substrate or can use another known device.

The unique spectral feature produced by the wavelength-specific filter 56 can reduce the ambiguity that can occur in the repeating frequency locations found in the repeating optical spectrum 55 from the signal produced by the repeating filter 56. In this way, the unique feature provides an absolute wavelength reference intrinsic to the output wavelength reference signal 58, and this intrinsic reference can remove the location ambiguity caused by the repeating spectrum. The unique feature produced by the wavelength-specific filter 56 can have a less strict wavelength accuracy requirement than the repeating spectrum, so long as its unique characteristics are identifiable by the wavelength-sensitive equipment 10.

For example, the wavelength-sensitive equipment 10 by itself may only be able to resolve any frequency differences at the standard $\pm 0.5 * \Delta F$ resolution. However, the equipment 10 can include an algorithm 60 to perform instantaneous frequency compensation of the resulting wavelength reference signal 58. Using the algorithm 60, the equipment 10 can increase the equipment's ability to resolve any frequency differences to the entire optical wavelength band of observation. In the instantaneous frequency compensation, for instance, the algorithm 60 utilizes the wavelength reference spectral information to recover from a measured frequency error in the reported spectrum at any time. The algorithm 60 can be used during the startup of the equipment 10 and can be used during the ongoing operation of the equipment 10.

In one example, the wavelength reference device 50 can use a super-luminescent light-emitting diode (SLED) for the broadband source 52 and can use a Fabry-Perot etalon for the repeating filter 54. A notch filter can be used for the wavelength-specific filter 56 after the Fabry-Perot etalon 54 to suppress a single etalon peak.

Along those lines, FIG. 3 illustrates one configuration for the wavelength reference device 50 of the present disclosure. The wavelength reference device 50 includes a super-luminescent light-emitting diode 120 (SLED) for the broadband optical source, a Fabry-Perot etalon 130 for the repeating filter, and a notch filter 140 for the wavelength-specific filter 56. The SLED 120 emits a broadband signal 128 along an optical path. The broadband signal 128 has optical power within a wavelength band. The Fabry-Perot etalon 130 is positioned in the optical path and is configured to filter the optical signal 128 into a repeating spectral response within the wavelength band. As an etalon, this filter 130 can have mirrors 134, 136 separated by a gap or a substrate 132.

For its part, the notch filter 140 is positioned in the optical path and is configured to filter out at least one predefined wavelength response within the wavelength band from the optical signal. Ultimately, the Fabry-Perot etalon 130 and the notch filter 140 output an output signal 58 for the wavelength reference having the repeating spectral response and lacking at least one peak at the at least one predefined wavelength response or stopband.

As illustrated here, the Fabry-Perot etalon 130 is configured to filter the broadband signal 128 from the SLED 120 to produce an intermediate signal 138 having the repeating spectral response. In turn, the notch filter 140 is configured to filter the intermediate signal 138 to remove the at least one predefined stopband and produce the output signal 58.

In a different configuration to that shown here, the notch filter 140 may instead be positioned between the SLED 120 and the Fabry-Perot etalon 130. In this instance, the notch filter 140 is configured to filter the broadband signal 120 from the SLED 120 to produce an intermediate optical signal having a stopband (e.g., at least one predefined wavelength response filtered out). In turn, the Fabry-Perot etalon 130 is configured to filter the intermediate signal to produce the output signal 58, which includes the repeating spectral response except for the at least one predefined wavelength response that has been previously filtered out.

Figures 4A, 4B, 4C:
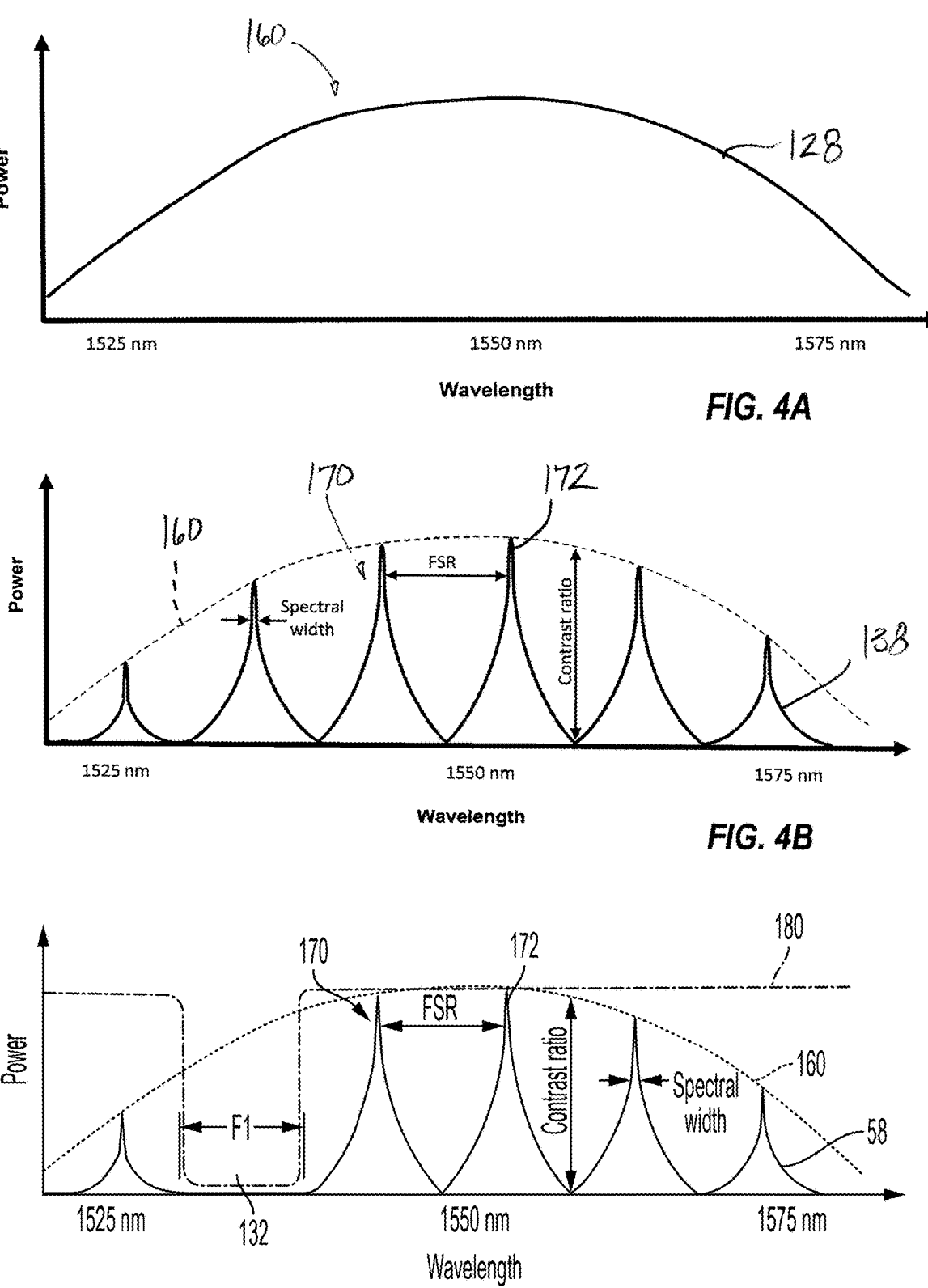
FIG. 4A illustrates a spectrum generated by a superluminescent light-emitting diode of the disclosed wavelength reference device.
FIG. 4B illustrates the spectrum filtered by a Fabry-Perot etalon of the disclosed wavelength reference device.
FIG. 4C illustrates the spectrum finally filtered by a notch filter of the disclosed wavelength reference device.

Having an understanding of one configuration of the disclosed wavelength reference device 50 having a SLED 120, a Fabry-Perot etalon 130, and a notch filter 140, the discussion turns to the spectral characteristics of the optical signals illustrated in FIGS. 4A, 4B, and 4C.

FIG. 4A illustrates an exemplary spectrum 160 of the broadband optical signal 128 generated by the SLED (120), as in the device (50) of FIG. 3. In this example, the spectrum 160 has a spectral profile extending between 1525 nm and 1575 nm with a center wavelength around 1550 nm. Other wavelength ranges can be used depending on the implementation.

In the disclosed device (50) as in FIG. 3, the Fabry-Perot etalon (120) of the wavelength reference device (50) then filters the SLED's broadband signal 128. FIG. 4B illustrates an exemplary spectrum 170 produced by a Fabry-Perot etalon (130) after filtering the SLED's spectrum 160 to produce an intermediate signal 138. The repeating spectrum 170 has spectral peaks 172 at resonant wavelengths of the etalon (130). (For reference, a dashed line indicates the envelope defined by the SLED's spectrum 160.)

The spectral peaks 172 of the filtered signal 138 occur at known frequencies that are temporally stable at a given temperature. The spectral peaks 172 are spaced apart in the resulting signal 138 by a constant spectral width called a "free spectral range" (FSR). The free spectral range is specific to the Fabry-Perot etalon (130) and is defined by:

$$\Delta\lambda(FSR) = \frac{\lambda^2}{nL}$$

where $\lambda$ is the wavelength of light (signal 128) incident onto the etalon (130); n is the refractive index of the media within the cavity (132) of the etalon (130); and L is the length of the cavity (distance between mirrors 134 and 136). The FSR, spectral width, and contrast ratio are key parameters that can be set during the manufacture of the etalon (130) to suit a specific application for the wavelength reference device (50). By way of example, one suitable etalon (130) for the device (50) may provide an FWHM spectral width of less than 5 GHz, a contrast ratio of at least 10 dB, and an FSR of around 100 GHz.

Given the known formula, the wavelength of each spectral peak 172 of the filtered optical signal 138 can be established by a calibration process using a wavemeter or an optical signal analyzer (OSA). In turn, each spectral peak 172 can be used as a reference spectral feature to reference and calibrate wavelength-sensitive equipment (10), such as an OCM module.

As the temperature of the Fabry-Perot etalon (130) changes, the refractive index changes, which affects the FSR. This is visible as a wavelength shift of the peaks 172, which can be measured. The typical glass substrate (132) used in the Fabry-Perot etalon (130) can have a temperature dependence of approximately 1.5 GHz/° C. This temperature dependency is accounted for in the wavelength reference device (50) as described below.

The parameters of the filtered optical signal 138 may be defined during manufacture to suit a corresponding application. The FSR of the spectrum 170 is determined primarily by the width (L) of etalon (130) and the material used to define the cavity (e.g., a glass substrate 132 having a refractive index of about 1.5). The FSR is chosen such that a plurality of wavelength peaks 172 (e.g., 10 or more) are present across the desired spectrum 170 to be referenced as each spectral peak 172 represents a sample point of known wavelength to characterize the optical spectrum. By way of example, in a telecommunications application across a spectrum of 4-5 THz, an FSR between 100 GHz and 200 GHz may be chosen to provide 20-50 reference spectral peaks 172 of known wavelength.

The width of each spectral peak 172 (typically characterized by the Full Width at Half Maximum—FWHM) can also be controlled to a degree by the reflectivities of the etalon's mirrors (134, 136). Typically, both mirrors (134, 136) will be highly reflecting having a reflectivity of greater than 50%. However, higher reflective mirrors (e.g., greater than 90% reflectivity) will produce narrower spectral peaks and higher contrast ratio in the filtered optical signal 138, thereby providing more accurate wavelength resolution. As a trade-off, however, the higher reflective mirrors (134, 136) will increase the insertion loss and therefore result in smaller peaks 172.

In the disclosed device (50) as in FIG. 3, the notch filter (140) of the wavelength reference device (50) filters the intermediate signal 138 having the spectrum 170 from the Fabry-Perot etalon (130) to produce an output optical signal 58. FIG. 4C illustrates an exemplary spectrum of the output optical signal 58 produced by the wavelength reference device (50) of the present disclosure. As shown, the notch filter (140) has a frequency response 180 having a stopband 182 at a frequency range, and the output signal 58 includes a wavelength-specific spectral feature at that stopband 182 in the repeating optical spectrum 170.

Again, the notch filter (140) can be configured to transmit most wavelengths incident thereto without much loss in optical power, but the power of light within a specific wavelength range (i.e., the stopband 182) is attenuated to a very low level. This stopband 182 in the frequency response is where a frequency (or small range thereof) is attenuated, reduced, missing, or otherwise filtered out. The frequency range, the steepness of the edges, and other characteristics of the stopband 182 can be configured for the implementation as needed.

As noted, the stopband 182 reduces the ambiguity that can occur in the repeating frequency locations in output signal 58 produced by the repeating optical spectrum 170. In this way, this stopband 182 provides an absolute wavelength reference intrinsic to the output signal 58 that removes the location ambiguity caused by the repeating spectrum 170. The unique stopband 182 can have a less strict wavelength accuracy requirement than the repeating spectrum 170, so long as the stopband's unique characteristics are identifiable by the wavelength-sensitive equipment (10).

Figure 4D:
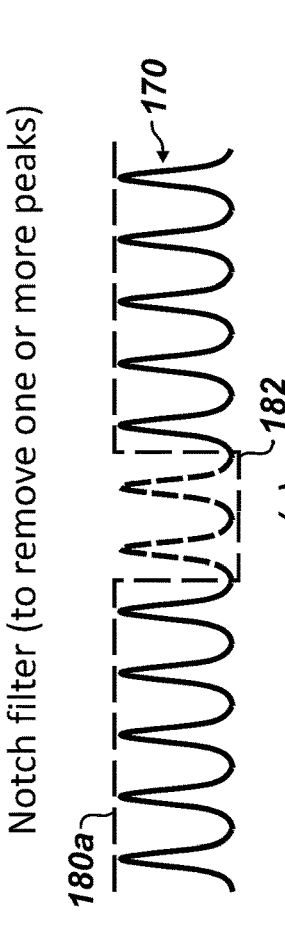
FIG. 4D illustrates examples of different filter arrangements that can be used according to the present disclosure to provide spectral characteristics for wavelength reference.
Figure 4D:
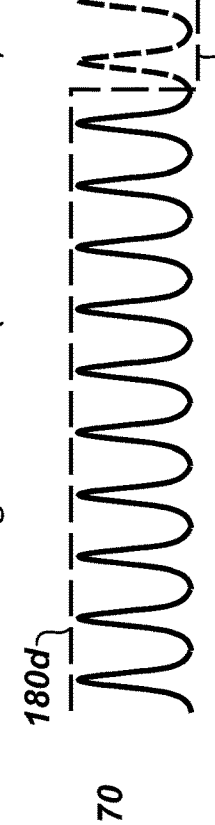
Figure 4D:
Figure 4D:
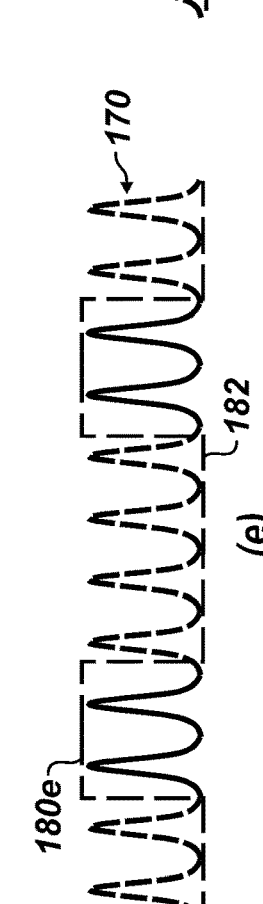

In addition to the filtering detailed above, other filter arrangements may create different types of spectral characteristics that can be used for the wavelength reference. For example, FIG. 4D illustrates examples of different filter arrangements that can be used according to the present disclosure. Graph (a) shows a notch filter 180a having a stopband 182 such as already discussed above. This stopband 182 of the notch filter 180a can attenuate more than one of the adjacent peaks of the repeating optical spectrum 170 and can pass the other peaks outside of these. As shown in Graph (b), the notch filter can be expanded to an edge pass notch filter 180b that attenuates a set of adjacent peaks at a wider stopband 182 while passing peaks towards upper and lower frequencies (edges or ends) of the repeating optical spectrum 170.

Graphs (c) and (d) show band edge filters 180c-d that attenuate one or more peaks of a repeating optical spectrum 170 at a stopband 182 towards upper or lower frequencies (edges or ends). Graph (e) shows a multi-band pass filter 180e that attenuates sets of one or more adjacent peaks at multiple stopbands 182 and passes the other intervening sets of one or more adjacent peaks of the repeating optical spectrum 170. As an opposite to the edge pass notch filter in graph (e), graph (f) shows a full bandpass filter 180f that attenuates sets of one or more adjacent peaks with stopbands 182 at both upper and lower frequencies (edges or ends) while passing the intervening peaks of the repeating optical spectrum 170. Filters that produce these and other types of spectral characteristics can be used for the wavelength reference of the present disclosure.

Figures 5A, 6:
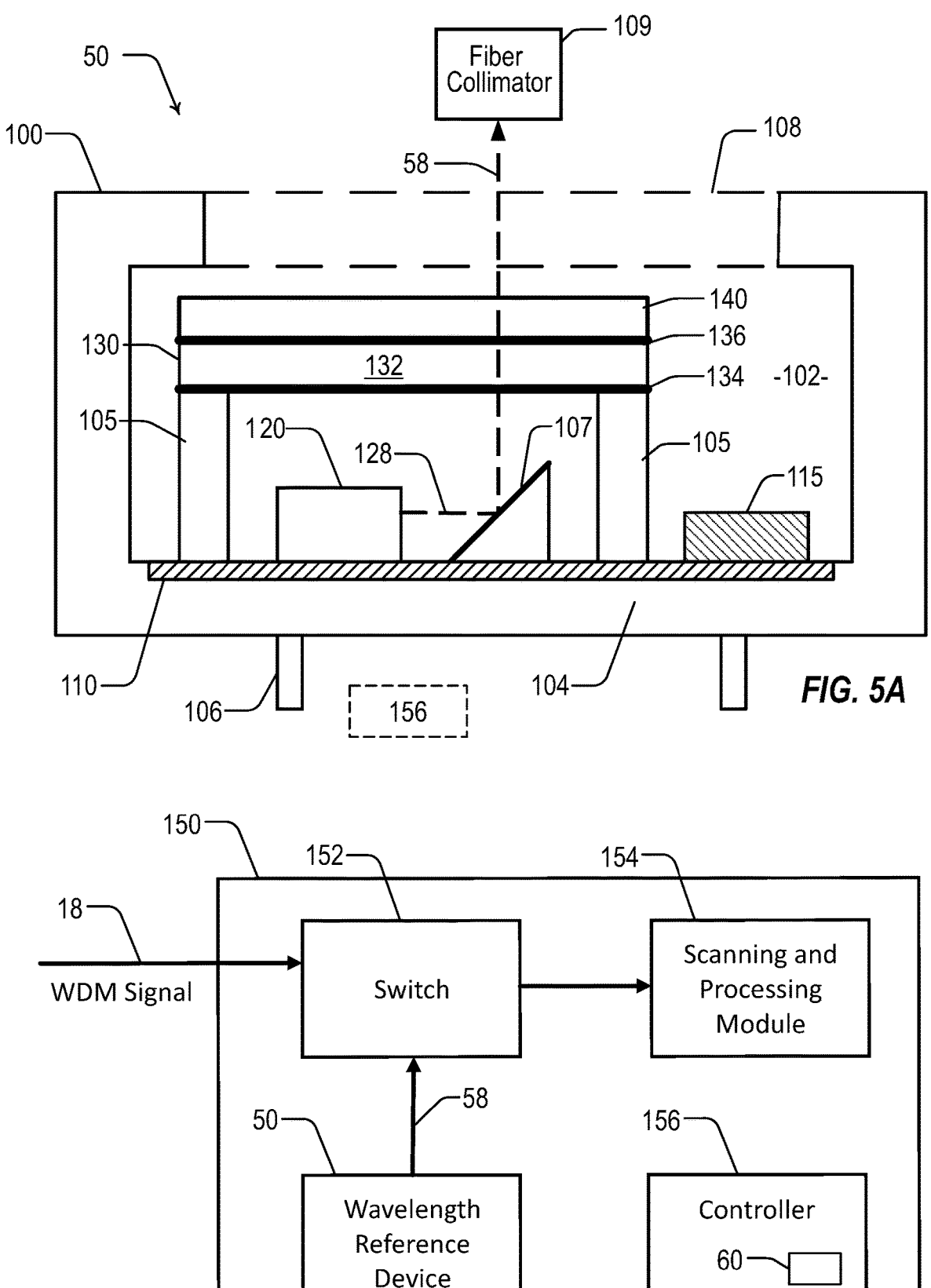
FIG. 5A schematically illustrates one configuration for the wavelength reference device of the present disclosure in more detail.
FIG. 6 illustrates a schematic system diagram of an optical channel monitor module incorporating a wavelength reference device of the present disclosure.

The wavelength reference device 50 of the present disclosure may be implemented in several ways. FIG. 5A schematically illustrates one configuration for the wavelength reference device 50 of the present disclosure in more detail. In this configuration, the wavelength reference device 50 is an integrated device, including a SLED 120, a Fabry-Perot etalon 130, and a notch filter 140. These components are integrated into a housing 100 defining an internal environment 102. The device 50 is integrated in that each of the components is integrated into a single package that provides for a standalone device. That is, the wavelength reference device 50 does not need to leverage components from the optical equipment (10) to which the wavelength reference is provided. (As discussed further below, however, other configurations can be used.)

The housing 100 can be formed of a transistor outline (TO) package, such as a TO-46 package. The TO package provides a sealed protective housing for internal components and provides for simple mounting of electrical components onto a TO header 104, which forms a base of the housing 100. The TO header 104 includes a plurality of internal electrical pins (not shown) for electrically mounting electrical components thereto and which are connected to external control pins 106. In turn, the pins 106 can be connected to a controller (156), such as a digital processor or the like, for powering and providing control signals to the components of the device 50.

The device 50 includes a broadband optical source in the form of a super-luminescent light-emitting diode (SLED) 120 disposed on the TO header 104 of the housing 100. The SLED 120 is configured to emit a broadband optical signal 128 along an optical path through the device 50 to an optical output 108. The SLED 120 may be any suitable device providing a power spectral density of sufficient magnitude across the wavelength range of interest. For example, for the optical transmission C-band, power density between 1525 nm to 1570 nm may be preferred. In other embodiments, the SLED 120 may be replaced with other types of broadband optical sources, such as one or more LEDs or amplified spontaneous emission (ASE) from an optical amplifier.

The device 50 also includes a repeating filter in the form of the Fabry-Perot etalon 130 disposed within the housing 100 and positioned in the optical path to filter the broadband signal 128 to define an intermediate filtered signal. As noted, the intermediate filtered signal includes one or more reference spectral features having a known wavelength at a known temperature in the form of one or more repeating spectral peaks of the etalon's resonant wavelengths. The absolute wavelength of these spectral peaks is initially registered using a separate spectral measurement device, such as an OSA or wavemeter, in an initial instrument calibration procedure. This calibration procedure is performed after the assembly of the wavelength reference device 50.

As before, the Fabry-Perot etalon 130 can be formed of a glass substrate 132 having a pair of parallel sides on which mirrors 134 and 136 are deposited. The glass substrate 132 has a finite thickness to separate the mirrors 134, 136 by a fixed distance. The glass substrate 132 between the mirrors 134, 136 has a refractive index that is known to a high degree of accuracy. In some embodiments, the Fabry-Perot etalon 130 may be formed of materials other than glass. In fact, the Fabry-Perot etalon 130 may be formed of two parallel plates separated by an air gap.

As shown in this example, the SLED 120 is positioned horizontally on the TO header 104 to emit the optical signal 128 horizontally. A turning mirror 107 disposed on the header 104 is angled at approximately 45 degrees and directs the horizontally propagating optical signal 128 vertically onto the Fabry-Perot etalon 130. The mirrors 134, 136 of the Fabry-Perot etalon 130 are disposed substantially horizontally such that optical signal 128 is incident perpendicularly onto an outer surface of mirror 134. (As will be appreciated, other geometric arrangements can be used.)

For efficient packaging of the device 50, the etalon 130 can be positioned above the SLED 120 and the turning mirror 107, and the etalon 130 can be held in place by supports 105. However, this need not be the case and different orientations and configurations of SLED 120, and the use of other components is possible. The SLED 120 typically has a wide divergence (up to 10's of degrees) and collimating/focusing lenses or mirrors (not shown) can help confine the light for more efficient coupling. In the device 50, the optical path between SLED 120, etalon 130, and notch filter 140 is fixed in space with no moving components. This fixed optical path provides for a very stable frequency output from device 50.

As discussed previously, the mirrors 134, 136 of the etalon 130 define a resonant cavity within which the optical signal 128 can resonate. Wavelengths that are an integer multiple of the mirror spacing will resonate within the etalon 130 and will dominate the power of the signal that passes through the mirror 136. These resonant wavelengths form an intermediate filtered signal, which has a repeating spectral response at a plurality of wavelengths and which passes to the notch filter 140.

The notch filter 140 is configured to remove at least one peak in at least one stopband in the spectrum. As shown, the notch filter 140 can be disposed on the Fabry-Perot etalon 130. As an alternative, the notch filter 140 can be disposed on (or incorporated into) the window 108. The notch filter 140 can use a dielectric stack on a substrate or can use another known device. The notch filter 140 filters the intermediate signal from the etalon 130 and produces a filtered output signal 58.

As noted above, the notch filter 140 creates a wavelength-specific spectral feature (e.g., stopband) in the repeating optical spectrum for the output signal 58 of the wavelength reference device 50. This wavelength-specific spectral feature reduces the ambiguity that can occur in the repeating frequency locations found in the repeating optical spectrum. In this way, this feature provides an absolute wavelength reference intrinsic to the output signal that removes the location ambiguity caused by the repeating spectrum.

The filtered optical signal 58 is directed through a transparent window 108 in the housing 100. The window 108 forms an optical output for outputting filtered optical signal 58 from the device 50. The transparent window 108 is preferably formed of a glass material that is highly transparent at the wavelengths of the SLED 120.

The filtered optical signal 58 is typically coupled to a fiber collimator 109 for coupling the signal to equipment (10), such as an OCM module, designed to utilize this wavelength reference signal 58. In some embodiments, the window 108 or housing 100 includes a coupling structure (not shown), such as a fiber connector, to connect fiber to the device 50. In some embodiments, the transparent window 108 includes a lensing structure (not shown) to focus, partially focus, collimate, or partially collimate the filtered optical signal 58 to couple it more efficiently into the fiber collimator 109.

The collimator 109 may be formed integrally with the housing 100 and can be provided as a single package with the device 50 and optionally a length (pigtail) of optical fiber. In some embodiments (not illustrated), the device 50 includes a connector for connecting an optical fiber or the collimator 109 to the housing 100 adjacent the transparent window 108.

In one configuration, the device 50 may not include any active temperature control. The etalon 130, as well as the SLED 120 and other components, may be subject to temperature variations that can affect the characteristics of the output signal 58. Nevertheless, provided there are proper operating conditions, known temperature values, and a stable output signal, the wavelength-specific features produced by the device 50 can be used by equipment (10) to resolve any frequency differences.

In another configuration, however, temperature control can be actively provided by a temperature control device 110, such as a thermoelectric controller, a thermoelectric cooling element (TEC), a Peltier device, a resistive heater, or another thermal source, incorporated into the device 50. The temperature control device 110 can provide active temperature control and can act as a thermal source or temperature sink. The temperature control device 110 can be controlled by a controller (e.g., either a dedicated controller or a system controller 156 as in FIG. 6). Also, the temperature control device 110 can have either heating or cooling capability, or both heating and cooling capability.

The device 50 also includes a thermistor 115 for sensing the temperature within the environment 102. However, in some embodiments, the temperature control device 110 includes an internal thermistor or another temperature sensor thereby avoiding the need for a separate thermistor 115. The temperature control device 110 can be mounted within the housing 100 directly onto the TO header 104 and can be powered by electrical the pins 106. In this manner, setting the temperature of the temperature control device 110 provides for directly setting the temperature of the environment 102 and/or any of the components in the housing 100.

Together, the controller 156, the thermistor 115, and the temperature control device 110 provide for a complete temperature control loop in which the temperature of at least the etalon 132 can be adjusted, set, and controlled. In particular, the controller 156 can be configured to receive a temperature signal from thermistor 115 and, in response, can send a control signal to the temperature control device 110 to switch on/off or increase/reduce the thermal output of the temperature control device 110 to adjust the temperature of the etalon 130. Further details associated with these benefits are provided in co-pending U.S. application Ser. No. 17/112, 583 filed Dec. 4, 2020, which is incorporated herein by reference in its entirety.

Figure 5B:
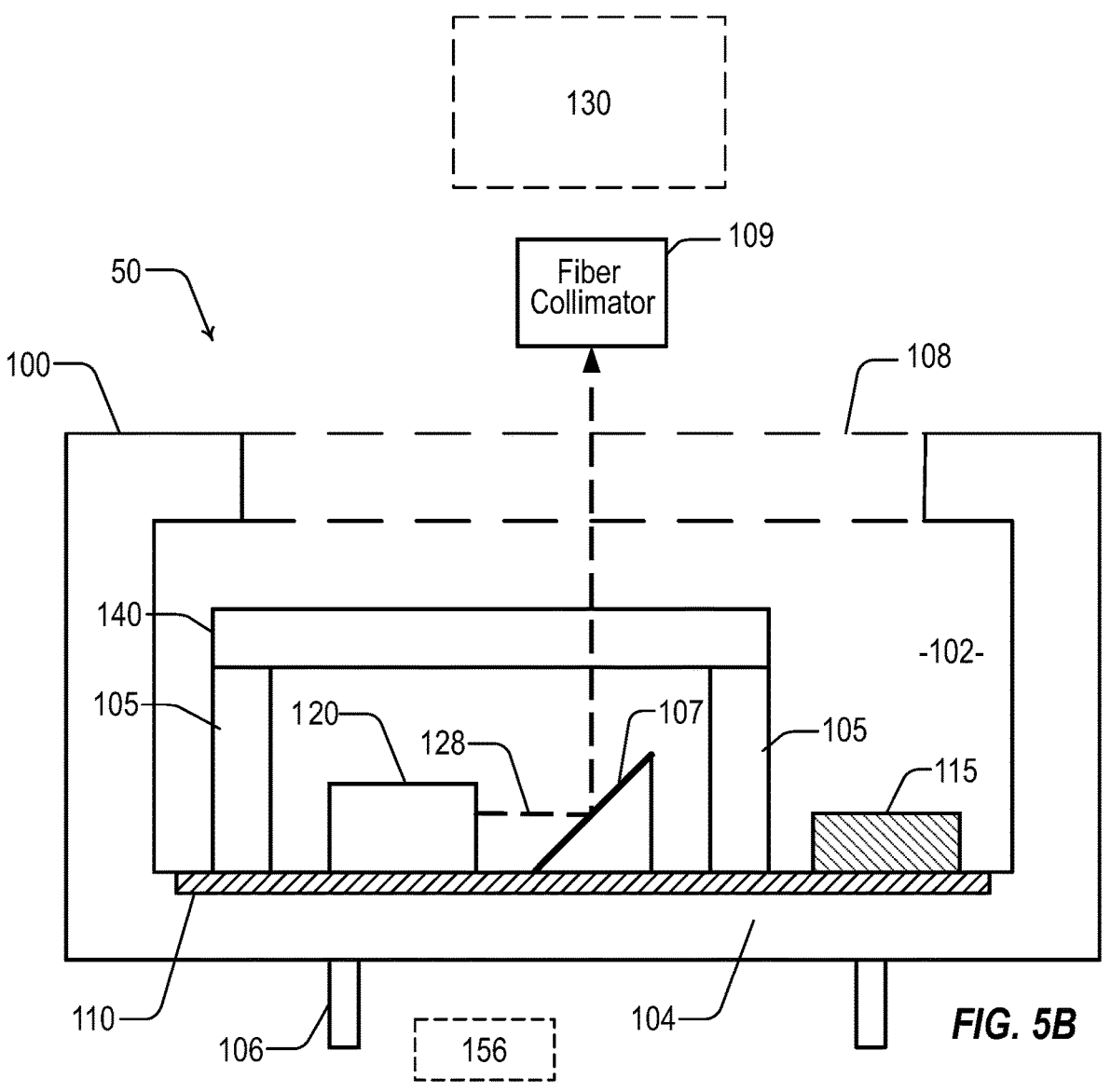
FIG. 5B schematically illustrates another configuration for the wavelength reference device of the present disclosure in more detail.

FIG. 5B schematically illustrates another configuration for the wavelength reference device 50 of the present disclosure in more detail. This configuration is similar to that disclosed above with reference to FIG. 5A so that like reference numerals are used for similar components. Here, the housing 100 encloses the SLED 120 and the notch filter 140. The repeating filter 130, such as the Fabry-Perot etalon, is housed separately and can be fiber coupled to the fiber collimator 109. (Another configuration can instead have the SLED 120 and Fabry-Perot etalon 130 housed in the housing 100 with the notch filter 140 housed separately and fiber-coupled to the fiber collimator 109.)

Together, the controller 156, the thermistor 115, and the temperature control device 110 provide for a complete temperature control loop in which the temperature of at least the SLED 120 can be adjusted, set, and controlled. In particular, the controller 156 can be configured to receive a temperature signal from thermistor 115 and, in response, can send a control signal to the temperature control device 110 to switch on/off or increase/reduce the thermal output of the temperature control device 110 to adjust the temperature of at least the SLED 120. Where the temperature control device 110 includes temperature sensing capability, this feedback loop may be implemented directly by the temperature control device 110 in response to control signals from the controller 156. The temperature control may be based on user-specified or other predefined temperature values for the SLED 120, which are conducive to efficient operation and accurate wavelength referencing as disclosed herein. Further details associated with these benefits are provided in co-pending U.S. application Ser. No. 17/826,523, also filed on May 27, 2022 entitled "Wavelength-Tuned SLED Used As Optical Source For Ultra-Wideband Wavelength Reference" which is incorporated herein by reference in its entirety.

As disclosed herein, the wavelength reference device 50 can be a modular component having an integrated package of elements. This allows the device 50 to be assembled, tested, and calibrated on its own and independently of other equipment (e.g., OCM module) and then readily integrated directly into the circuitry and the optical path of the equipment.

In operation, the device 50 can be incorporated into a broader optical measurement instrument, such as an OCM module, as a component of that instrument. To that end, FIG. 6 illustrates a schematic system diagram of an optical channel monitor module 150 incorporating a wavelength reference device 50 of the present disclosure. The OCM module 150 can be similar to that disclosed in U.S. Pat. No. 9,628,174, which is incorporated herein by reference.

The OCM module 150 is configured to receive an incoming wavelength division multiplexed (WDM) signal 18. Both the WDM signal 18 and the filtered optical signal 58 from the device 50, which represents a wavelength reference signal, are coupled to an input or optical switch module 152, which is capable of switching which of the signals is to be passed to a scanning and processing module 154. In turn, the scanning and processing module 154 performs the primary spectral monitoring of the WDM channel spectrum.

A controller 156 performs controlling functions of the OCM module 150, including controlling the switch 152 to switch between the WDM signal 18 and the wavelength reference signal 58. The controller 156 may represent an internal controller of the OCM module 150 capable of also controlling the wavelength reference device 50. For example, the controller 156 can monitor the temperature of the internal environment of the device 50 to calibrate the spectral peaks of the signal 58, set the temperature of the device 50 with the active temperature control, and the like. Alternatively, a separate controller (not shown) specific to the wavelength reference device 50 can be used in the module 150.

To perform the various functions, the controller 156 includes drivers for components, such as thermistors, TECs, and the like. The controller 156 includes an algorithm 60, such as noted previously, to perform instantaneous frequency compensation of the resulting wavelength reference signal 58. Using the algorithm 60, the controller 156 can increase the module's ability to resolve any frequency differences to the entire optical wavelength band of observation. In the instantaneous frequency compensation, the algorithm 60 utilizes the wavelength reference spectral information to recover from a measured frequency error in the reported spectrum at any time. The algorithm 60 can be used during the startup of the module 150 and can be used during the ongoing operation of the module 150.

In previous configurations, the wavelength reference device 50 integrated the broadband source (SLED 120), the repeating filter (Fabry-Perot etalon 130), and the wavelength-specific filter (notch filter 140) in a suitable housing. Other configurations are possible. For example, the wavelength reference device 50 can incorporate any two of these components (120, 130, 140) together in a housing for use with the remaining component as a separate element from the housing. Likewise, the wavelength reference device 50 can be constructed from each of the components (120, 130, 140) arranged as separate elements in optical communication with one another.

Figures 7, 8, 9, 10:
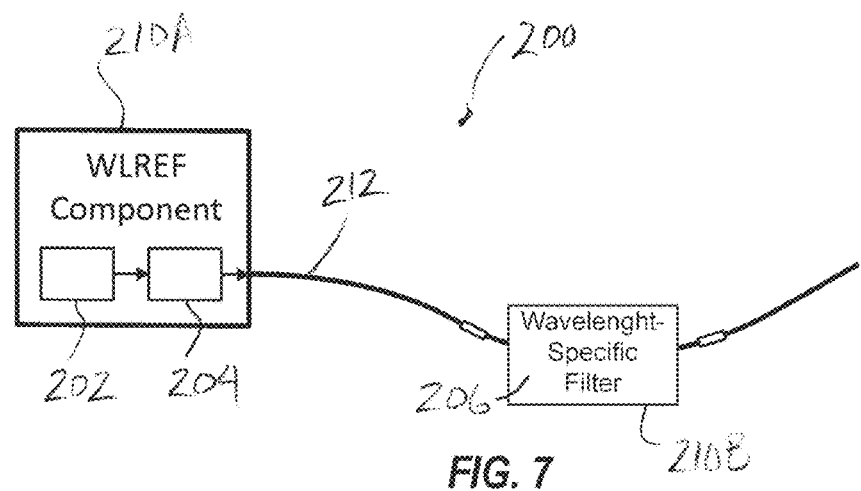
FIGS. 7, 8, 9, and 10 illustrate various configurations for the disclosed wavelength reference device.

For example, FIG. 7 illustrates a configuration in which a wavelength reference device 200 includes a first component 210A coupled by fiber to a second component 210B. The first component 210A has the broadband optical source (SLED) 202 and a first filter 204 disposed in a housing, which has a fiber-coupled output 212. The second component 2106 is a fiber-coupled device, which has a second filter 206 and which can be spliced to the first component 210A.

In this way, the second component 210B can be spliced into an existing optical path for the wavelength reference. The filter location can be anywhere in the optical fiber path after the optical source 202 in the first component 210A. The first filter 204 can be the Fabry-Perot etalon, and the second filter 206 in the second component 210B can be a notch filter. A reverse arrangement can also be used.

In another example, a wavelength-specific filter can be incorporated in the packaging of the optical source or the repeating filter as a stand-alone component. For example, FIG. 8 shows a SLED package 220 having a dielectric filter chip 224 to provide the wavelength-specific notch filter. This dielectric filter chip 224 is integrated in the package 220 along with the SLED components 222. FIG. 9 shows a repeating filter package 230 having a dielectric filter chip 234 to provide the wavelength-specific notch filter. Again, this chip 234 is integrated into the package 230 along with the repeating filter components 232, such as a Fabry-Perot etalon.

FIG. 10 shows a source/filter package 240 having a modified subcomponent 242. For example, the existing sub-component 242 can be modified to include a unique wavelength signature by changing an existing anti-reflection (AR) coating into a wavelength-specific AR coating that incorporates the wavelength-specific feature (stopband).

In that sense, the wavelength reference device of the present disclosure can include (i) a housing having the broadband optical source, the repeating filter, and the wavelength-specific filter integrated therein, (ii) a housing having the broadband optical source and the repeating filter integrated therein with the wavelength-specific filter being separate, (iii) a housing having the broadband optical source and the wavelength-specific filter integrated therein with the repeating filter being separate, (iv) a housing having the repeating filter and the wavelength-specific filter integrated therein with the broadband optical source being separate; or (v) separate housings for each of the broadband optical source, the repeating filter, and the wavelength-specific filter.

The wavelength reference device can be fiber-coupled, and any of the housings can have a fiber input and/or a fiber output. For (iv) the repeating filter and the wavelength-specific filter integrated in a housing, for example, the fiber input can be configured to receive the optical signal from the broadband optical source, and the fiber output is configured to output the output optical signal. For (v) the repeating filter disposed in the housing, the fiber input can be configured to receive an intermediate optical signal from (a) the broadband optical source or (b) the wavelength-specific filter, and the fiber output can be configured to output (a) an intermediate signal for the wavelength-specific filter or (b) the output optical signal. For (vi) the wavelength-specific filter disposed in the housing, the fiber input can be configured to receive the optical signal from (a) the broadband optical source or (b) the repeating filter, and the fiber output can be configured to output (a) an intermediate signal for the repeating filter or (b) the output optical signal.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A wavelength reference device, comprising:
   a sealed housing comprising a window, the sealed housing comprising a transistor outline package defining an internal environment and;
   a broadband optical source within the internal environment and configured to emit optical power along an optical path, the optical power having a wavelength band;
   a repeating filter within the internal environment and positioned in the optical path and being configured to filter the optical power into a repeating spectral response within the wavelength band, the repeating filter comprising a glass substrate between two mirrors, the glass substrate having a refractive index that varies with a temperature of the internal environment;
   a wavelength-specific filter positioned on the repeating filter and within the internal environment and being configured to attenuate the optical power of at least one predefined wavelength response within the wavelength band; and
   a temperature sensor disposed within the internal environment and adapted to provide a temperature signal indicative of the temperature of the internal environment,
   wherein the repeating filter and the wavelength-specific filter output a wavelength reference signal of the optical power having the repeating spectral response attenuated at the at least one predefined wavelength response.

2. The wavelength reference device of claim 1, wherein the repeating filter is configured to filter the optical power from the broadband optical source to produce an intermediate optical signal; and wherein the wavelength-specific filter is configured to filter the intermediate optical signal to produce the wavelength reference signal.

3. The wavelength reference device of claim 1, wherein the wavelength-specific filter is configured to filter the optical power from the broadband optical source to produce an intermediate optical signal; and wherein the repeating filter is configured to filter the intermediate optical signal to produce the wavelength reference signal.

4. The wavelength reference device of claim 1, wherein the device is a fiber-coupled device, the housing having a fiber output.

5. The wavelength reference device of claim 1, wherein the broadband optical source comprises a super-luminescent light-emitting diode.

6. The wavelength reference device of claim 1, wherein the repeating filter comprises a Fabry-Perot etalon.

7. The wavelength reference device of claim 1, wherein the wavelength-specific filter comprises a notch filter, a band-stop filter, a band-rejection filter, or a dielectric filter.

8. The wavelength reference device of claim 1, wherein the wavelength-specific filter comprises:
   a notch filter having a stopband configured to attenuate the optical power of one or more adjacent peaks in the repeating spectral response; or
   an edge pass filter having a stopband configured to attenuate the optical power of multiple adjacent peaks in the repeating spectral response; or
   a full band filter having stopbands configured to attenuate the optical power of one or more adjacent peaks at upper and lower frequencies in the repeating spectral response; or
   a band edge filter having a stopband configured to attenuate the optical power of one or more adjacent peaks at upper or lower frequencies in the repeating spectral response; or
   a multi-band pass filter having multiple stopbands configured to attenuate the optical power of multiple sets of one or more adjacent peaks in the repeating spectral response.

9. The wavelength reference device of claim 1, further comprising a temperature control device within the sealed housing, the temperature control device disposed in thermal communication with at least one of the broadband optical source and the repeating filter and being configured to adjust the temperature of the internal environment.

10. The wavelength reference device of claim 9, wherein the temperature control device is configured to adjust the operating temperature of the repeating filter to at least one known temperature; and wherein at least the repeating filter is configured to filter the optical signal into the repeating spectral response that includes at least one reference spectral feature for at least one known wavelength at the at least one known temperature.

11. The wavelength reference device of claim 9, wherein the temperature control device comprises a thermal source having heating and/or cooling functionality, a resistive heater, or a thermoelectric cooling element.

12. The wavelength reference device of claim 9, further comprising a controller in electrical communication with the temperature control device and the temperature sensor, the controller being configured to monitor the temperature signal of the temperature sensor and being configured to adjust electrical power to the temperature control device in response to the temperature signal.

13. The wavelength reference device of claim 9, wherein the temperature sensor comprises a thermistor.

14. An apparatus to process signal input, the apparatus comprising:
   an input of the apparatus receiving the signal input;
   a signal detection and processing module configured to detect and process the signal input;
   a wavelength reference module having a device according to claim 1 disposed in optical communication with the input, the device being configured to produce a wavelength reference; and
   at least one controller in signal communication with at least the signal detection and processing module and the wavelength processing module, the at least one controller configured to control the wavelength reference module and configured to calibrate the signal detection and processing module based on the produced wavelength reference.

15. The apparatus of claim 14, wherein at least the input, the signal detection and processing module, and the at least one controller comprise first components integrated into the apparatus; and wherein the wavelength reference module having the device comprises a second component being modular to the first components and being integrated into the apparatus.

16. The apparatus of claim 14, wherein the apparatus comprises an optical channel monitor (OCM); and wherein the input comprises an optical switch module being operable to switch the signal input to be passed to the detection and processing module.

17. The wavelength reference device of claim 9, wherein the temperature control device is mounted directly to a header of the transistor outline package.

18. The wavelength reference device of claim 1, further comprising a mirror within the environment and adapted to redirect light from the broadband optical source to the repeating filter.

19. The wavelength reference device of claim 1, wherein the repeating filter and the wavelength-specific filter are positioned between with window and the broadband optical source.

* * * * *